US012631130B2

(12) United States Patent
Jamiołkowski et al.

(10) Patent No.: US 12,631,130 B2

(45) Date of Patent: May 19, 2026

(54) TRAILING MEMBER FOR A STRUT OF A GAS TURBINE EXHAUST DIFFUSER, STRUT ASSEMBLY, AND GAS TURBINE EXHAUST DIFFUSER

(71) Applicant: GE Infrastructure Technology LLC, Greenville, SC (US)

(72) Inventors: Robert Jamiołkowski, Masovian (PL); Robert Jacek Zreda, Masovian (PL); Piotr Edward Kobek, Masovian (PL)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/960,227

(22) Filed: Nov. 26, 2024

(65) Prior Publication Data

US 2025/0179936 A1 Jun. 5, 2025

(30) Foreign Application Priority Data

Dec. 1, 2023 (PL) ........................................ 446955

(51) Int. Cl.

| | |
|---|---|
| ***F01D 25/30*** | (2006.01) |
| ***F01D 9/02*** | (2006.01) |
| ***F01D 25/24*** | (2006.01) |

(52) U.S. Cl.

CPC ............... *F01D 25/30* (2013.01); *F01D 9/02* (2013.01); *F01D 25/246* (2013.01); *F05D 2220/32* (2013.01); *F05D 2240/128* (2013.01)

(58) Field of Classification Search

CPC ................................ F01D 5/147; F01D 25/30

See application file for complete search history.

(56) References Cited

U.S. PATENT DOCUMENTS 9,556,749 B2 * 1/2017 Pauli ........................ F01D 25/30
2016/0208642 A1 * 7/2016 Shteyman ............... F01D 25/04

FOREIGN PATENT DOCUMENTS

EP 1508399 B1 2/2005
EP 2365191 B1 8/2018
EP 3336318 B1 6/2020

OTHER PUBLICATIONS

European Extended Search Report for EP Application No. 24211102.9 dated May 14, 2025; 7 pgs.

* cited by examiner

*Primary Examiner* — Courtney D Heinle
*Assistant Examiner* — John S Hunter, Jr.
(74) *Attorney, Agent, or Firm* — Fletcher Yoder, P.C.

(57) ABSTRACT

A trailing member for a strut of a gas turbine exhaust diffuser includes an upstream side a downstream end spaced along a downstream direction from the upstream side, and two side walls extending from the upstream side to the downstream end. A distance between the two side walls decreases along a direction from the upstream side to the downstream end. A longitudinal extent of the trailing member extends along the upstream side between a first longitudinal end and a second longitudinal end. A first edge of each side wall is disposed proximate to the first longitudinal end. A stress relief slot is provided in at least one of the first and second side walls of the two side walls and opens at the first edge of the respective side wall.

19 Claims, 6 Drawing Sheets

TRAILING MEMBER FOR A STRUT OF A GAS TURBINE EXHAUST DIFFUSER, STRUT ASSEMBLY, AND GAS TURBINE EXHAUST DIFFUSER

CROSS-REFERENCE TO RELATED APPLICATIONS

This application claims priority pursuant to 35 U.S.C. 119(a) to Polish Application No. P.446955, filed Dec. 1, 2023, which application is incorporated herein by reference in its entirety.

TECHNICAL FIELD

The present disclosure relates to a trailing member for a strut of a gas turbine exhaust diffuser as set forth in the claims. It further relates to a strut assembly comprising the trailing member and a gas turbine exhaust diffuser comprising the strut assembly.

BACKGROUND OF THE DISCLOSURE

In gas turbine exhaust diffusers, an inner diffuser barrel is suspended inside an outer diffuser barrel by struts. The inner barrel may contain, for instance, an aft bearing of the gas turbine rotor. The thus formed annular flow conduit is flowed through by exhaust gases, which may reach temperatures well in excess of 500° C., which temperature is subject to change comparatively quickly when the gas turbine power output changes.

In certain gas turbines, the strut may actually be a strut assembly comprising an upstream strut body and a downstream trailing member. To achieve an aerodynamic shape, the trailing member may form a trailing edge and may be referred to as a trailing edge member. While the strut body is attached to the inner and outer diffuser barrels, for instance and most commonly by a weld connection, in certain known diffusers the radially outer end of the trailing member is not fixed to the outer diffuser barrel. A flow shield is provided at and attached to the outer diffuser barrel. The flow shield, which is essentially a skirt of sheet metal extending around a part of the circumference of a downstream portion of the trailing member, includes the downstream end of the trailing member and terminates, upstream in known embodiments, at least essentially flush with the seam between the strut body and the trailing member. The flow shield reduces ingestion of hot combustion gases into a gap between the radially outer end of the trailing member and the outer diffuser barrel and limits the amplitude of vibration of the radially outer end of the trailing member. However, cracking may be observed in the proximity of the location where the strut body and flow shield are attached to the outer barrel in view of an aggregation of causes, such as the intersection of several weld seams and the interconnection of several components, the temperature gradients over time, and vibration-induced mechanical alternating stresses, which are typically experienced in an exhaust diffuser of a gas turbine engine. This results in the need for frequent inspection and maintenance. Remedy, or at least improvement, in the strut design and/or strut-barrel interface is desired.

SUMMARY OF THE SUBJECT MATTER OF THE PRESENT DISCLOSURE

It is an object of the present disclosure to suggest a device of the type initially mentioned. In a more specific aspect, an improvement of the art shall be provided. In a more specific aspect of the herein suggested subject matter, issues of the art, including, while not limited to, those mentioned above shall be mitigated or avoided.

Specifically, the present disclosure is directed to a trailing member for a strut of a gas turbine exhaust diffuser, the trailing member comprising: an upstream side, a downstream end spaced along a downstream direction from the upstream side, two side walls extending from the upstream side to the downstream end, wherein a distance between the two side walls decreases along a direction from the upstream side to the downstream end, whereby a cross-section of the trailing member tapers from the upstream side to the downstream end, wherein a longitudinal extent of the trailing member extends along the upstream side of the trailing member between a first longitudinal end of the trailing member and a second longitudinal end of the trailing member, wherein a first edge of each side wall is disposed proximate to the first longitudinal end of the trailing member; and wherein a stress relief slot is provided in at least one of the first and second side walls of the two side walls and opens at the first edge of the respective side wall.

A strut of a gas turbine exhaust diffuser having the trailing member and a gas turbine exhaust diffuser having the strut are also provided.

Further effects and advantages of the disclosed subject matter, whether explicitly mentioned or not, will become apparent in view of the disclosure provided below.

Accordingly, disclosed is a trailing member for a strut of a gas turbine exhaust diffuser. The trailing member extends from an upstream side, or, in more particular embodiments, an upstream face, along a downstream direction to a downstream end. The downstream end in frequent embodiments may form a trailing edge. Accordingly, in frequent embodiments, the trailing member may also be referred to as a trailing edge member. The trailing member in these frequent embodiments may provide a trailing edge of a strut assembly. Two side walls extend from the upstream side to the downstream end, wherein a distance between the two side walls decreases along a direction from the upstream side to the downstream end, whereby a cross-section of the trailing member tapers from the upstream side to the downstream end. More particularly, in various embodiments, the two side walls meet at a trailing edge of the trailing member.

A longitudinal extent of the trailing member extends along the upstream side of the trailing member between a first longitudinal end of the trailing member and a second longitudinal end of the trailing member. More specifically, it may be intended that the trailing member be installed in an exhaust diffuser as part of a strut assembly with the first longitudinal end proximate or adjacent to an outer, i.e., radially outer, diffuser barrel and the second longitudinal end proximate or adjacent to an inner, i.e., radially inner, diffuser barrel. The first longitudinal end of the trailing member may thus be referred to as a radially outer longitudinal end of the trailing member, and the second longitudinal end of the trailing member may be referred to as a radially inner longitudinal end of the trailing member. A first, or, in aspects, radially outer, edge of each side wall is disposed proximate to the first longitudinal end of the trailing member.

More specifically, the first edge of each side wall is disposed at the first longitudinal end of the trailing member or defines the first longitudinal end of the trailing member, respectively. A stress relief slot is provided in at least one of the first and second side walls and opens at the first edge of the respective side wall. In more particular embodiments, a stress relief slot, or at least one stress relief slot, is provided in both of the first and second side walls and opens at the first edge of the respective side wall. In use, the stress relief slot enables a certain degree of deformation of the trailing member at the first longitudinal end, proximate or adjacent to the outer barrel, with reduced stresses and helps to avoid cracking.

It is noted that, within the framework of the present disclosure, the use of the indefinite article “a” or “an” does in no way stipulate a singularity, nor does it exclude the presence of a multitude of the named member or feature. It is thus to be read in the sense of “at least one” or “one or a multitude of”.

In more specific embodiments, at least one stress relief slot provided in at least one of the first and second side walls and opening at the first edge of the respective side wall, when starting at its open end at the first edge of the respective side wall, terminates at a rounded stress relief hole. Hence, notching and related stress concentrations at the end of the stress relief slot are avoided.

In embodiments, the trailing member comprises a cover plate between the first and second side walls adjacent the first longitudinal end of the trailing member and extending across at least one of the at least one stress relief slot of at least one of the first and second side walls, wherein a stress relief slot is arranged in the cover plate and opens out at an edge of the cover plate adjacent to the at least one of the at least one stress relief slot of at least one of the first and second side walls. As such, the cover plate does not impede deformation of the first and/or second side wall, which is enabled by the stress relief slot(s) of the respective side wall. It goes without saying that a stress relief slot of the cover plate, when starting at an open end at an edge of the cover plate, may also terminate at a rounded stress relief hole.

Further, a cover plate provided adjacent to the first longitudinal end of the trailing member between the first and second walls may be provided with a U-shaped cutout adjacent an upstream edge of cover plate.

The cover plate may be weld connected to the first and second side walls. Along a distance adjacent to the upstream edge of the cover plate, the weld seam may be omitted. A gap between the cover plate and each of the first and second side walls thus is open. Accordingly, movement between the side walls and the cover plate is enabled in the region where the weld seam is omitted, and stress concentrations due, for instance, to thermal expansion differential are avoided.

The first edge of each of the first and second side wall may be convexly shaped in a side view onto the face of the respective side wall. More in particular, the first edge may comprise a kink in the side view and may more in particular comprise at least one straight edge segment, in the side view, terminating at the kink. In other embodiments, the kink, in the side view, may be provided between two straight edge segments. The design enables specific adaptation of the first longitudinal end of the trailing member to the outer barrel and enables an advantageous and adapted arrangement and dimensioning of a gap between the first longitudinal end of the trailing member and the outer barrel. The presence and width of a gap between the first longitudinal end of the trailing member and the outer barrel may thus vary in progression from the upstream side of the trailing member to the downstream end of the trailing member and may allow advantageous adaptation to the requirement to reduce mechanical stress formation.

It may further be provided, in embodiments, that each of the first and second side wall comprises a convex corner and wherein one of the at least one stress relief slot opens at the convex corner. This embodiment may be found particularly useful if the parts of the first and second side walls upstream—i.e., proximate to the upstream end of the trailing member—are intended to be connected and in particular to be weld connected to the outer barrel in order to mitigate stresses, which may develop between the more upstream and the more downstream sections of the first and second side walls.

Still further, it may be provided that the first edge of each side wall is recessed adjacent to the upstream side of the trailing member, thus having a recessed section. This means that, when the trailing member is installed in a diffuser, the most upstream radially outer corner of the trailing member provides a window and does not interfere with the weld seam through which a strut body is attached to the outer barrel of the diffuser. Further, the thus provided window facilitates inspection of the weld seam and the interface in general by simply optical inspection.

In more particular embodiments, the recessed section may comprise a concave corner, and the stress relief slot opens at the concave corner.

It may be provided that a distance between the upstream side of the trailing member and the downstream end of the trailing member decreases, in particular linearly, from the first longitudinal end of the trailing member to the second longitudinal end of the trailing member. That is, an extent of the trailing member in the upstream-downstream direction decreases from the first longitudinal end of the trailing member to the second longitudinal end of the trailing member, and in more particular embodiments the trailing member may be wedge-shaped. Using the trailing member as intended, i.e., inside a diffuser as the downstream part of a strut assembly, with the first longitudinal end of the trailing member being positioned proximate or adjacent to the outer barrel, i.e., radially outward, and the second longitudinal end of the trailing member being positioned proximate to or at the inner barrel, i.e., radially inward, the length of the strut assembly in an upstream-downstream direction is smaller at a radially inner position than at a radially outer position. This might yield aerodynamic benefits.

A stress relief slot may be provided proximate to the second (i.e., when in use as intended radially inner) longitudinal end of the trailing member. The stress relief slot opens at the downstream end of the trailing member.

Each stress relief slot herein described, when seen starting at an open end, may terminate at a rounded stress relief hole. As noted above, unfavorable stress concentrations at the end of the respective stress relief slot may thus be avoided.

In another aspect, a strut assembly is disclosed. The strut assembly comprises a strut body and a trailing member of any type described above. The strut body extends longitudinally between a first longitudinal end and a second longitudinal end. The strut body has an upstream end and a downstream side. The trailing member is attached to and longitudinally extends along the downstream side of the strut body, thereby forming a trailing, or downstream, section of the strut assembly. The upstream side of the trailing member is arranged adjacent to the downstream side of the strut body. The first longitudinal end of the trailing member is arranged proximate to the first longitudinal end of the strut body, and the second longitudinal end of the trailing member is arranged proximate to the second longitudinal end of the strut body. From this, it flows that the first longitudinal end of the strut body is intended, or adapted and configured, to be located radially outside when installed in a diffuser, whereas the second longitudinal end is intended to be located radially inward. The upstream end of the strut body may in particular be shaped convexly rounded in a cross-sectional view of the strut body so as to provide an aerodynamically shaped leading edge of the strut assembly, whereas the trailing member may provide a trailing edge of the strut assembly.

In this respect, it may be provided that the first (i.e., per the intended use, radially outer) longitudinal end of the trailing member is arranged proximate to the first longitudinal end of the strut body, wherein the trailing member, in a direction from the first longitudinal end of the trailing member to the second longitudinal end of the trailing member and measured along the upstream side of the trailing member, ends before the second longitudinal end of the strut body measured along the downstream side of the strut body. As indicated above, the first longitudinal end of the trailing member and the first longitudinal end of the strut body may be intended to be provided adjacent to and extending radially inward from an outer barrel of a diffuser, and the second longitudinal end of the trailing member and the second longitudinal end of the strut body may be intended to be provided adjacent to and extending radially outward from an inner barrel of the diffuser. Along a radially inner section of the strut assembly, the downstream end of the strut body is not covered by the trailing member, which in turn may yield adverse aerodynamic effects. On the upside, adverse effects on structural integrity caused by thermal stresses by the interference of the strut body, the trailing member, and the inner barrel of the diffuser are avoided. The section of the strut assembly along which the downstream end of the strut body is not covered by the trailing member may be comparatively small, and, as this section is provided in a radially inner region, a comparatively small fraction of the total mass flow may be affected by the aerodynamic imperfection, and the adverse aerodynamic effects may be more than outweighed by the gain through the avoidance of potential mechanical stress amplification.

In still a further aspect, disclosed is a turbo-engine diffuser, for one instance, but not limited to, a gas turbine exhaust diffuser, which comprises an inner barrel and an outer barrel, defining a flow path between them, and at least one strut assembly of any type set forth above extending between the inner barrel and the outer barrel. The first longitudinal end of the strut body is attached, in particular weld-connected, to the outer barrel, and the second longitudinal end of the strut body is attached, in particular weld-connected, to the inner barrel. Further, a flow shield is provided and attached, in particular weld-connected, to the outer barrel. The flow shield extends along a part of the circumference of a downstream portion of the trailing member adjacent to the first longitudinal end of the trailing member, including extending around the downstream end of the trailing member. An upstream edge of the flow shield is spaced from the downstream side of the strut body in a downstream direction of the diffuser. The flow shield serves, on the one hand, to inhibit excessive ingestion of gases (for instance combustion gases) between the radially outward provided longitudinal end of the trailing member and, on the other hand, inhibits excessive mechanical vibrations of the trailing member.

In embodiments, a gap may be provided between the trailing member and the outer barrel along a downstream section of the first longitudinal end of the trailing member, including the downstream end of the trailing member, wherein the first and second side walls of the trailing member are weld-connected to the outer barrel along at least a part of an upstream section of the trailing member. A stress relief slot provided in at least one of the first and second side walls may open at the edge of the respective side wall(s) in the non-welded section and adjacent to or bordering a downstream end of the weld seam.

As used herein, the term "proximate to," shall, in particular in relation to its use in connection with ends or sides of a member, express that one end or side of the member is closer to a specific second member or landmark of a member than another end or side. In particular, a member or landmark of a member that is described to be proximate to a second member or landmark of a member may, in more particular embodiments, be directly adjacent to or in contact with the second member or landmark of a member.

It is understood that the features and embodiments disclosed above may be combined with each other. It will further be appreciated that further embodiments are conceivable within the scope of the present disclosure and the claimed subject matter, which are obvious and apparent to the skilled person by virtue of the present disclosure.

BRIEF DESCRIPTION OF THE DRAWINGS

The subject matter of the present disclosure is now to be explained in more detail by means of selected exemplary embodiments shown in the accompanying drawings in which.

It is understood that the drawings are schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

DETAILED DESCRIPTION OF EXEMPLARY MODES OF CARRYING OUT THE TEACHINGS OF THE PRESENT DISCLOSURE

Figure 1:
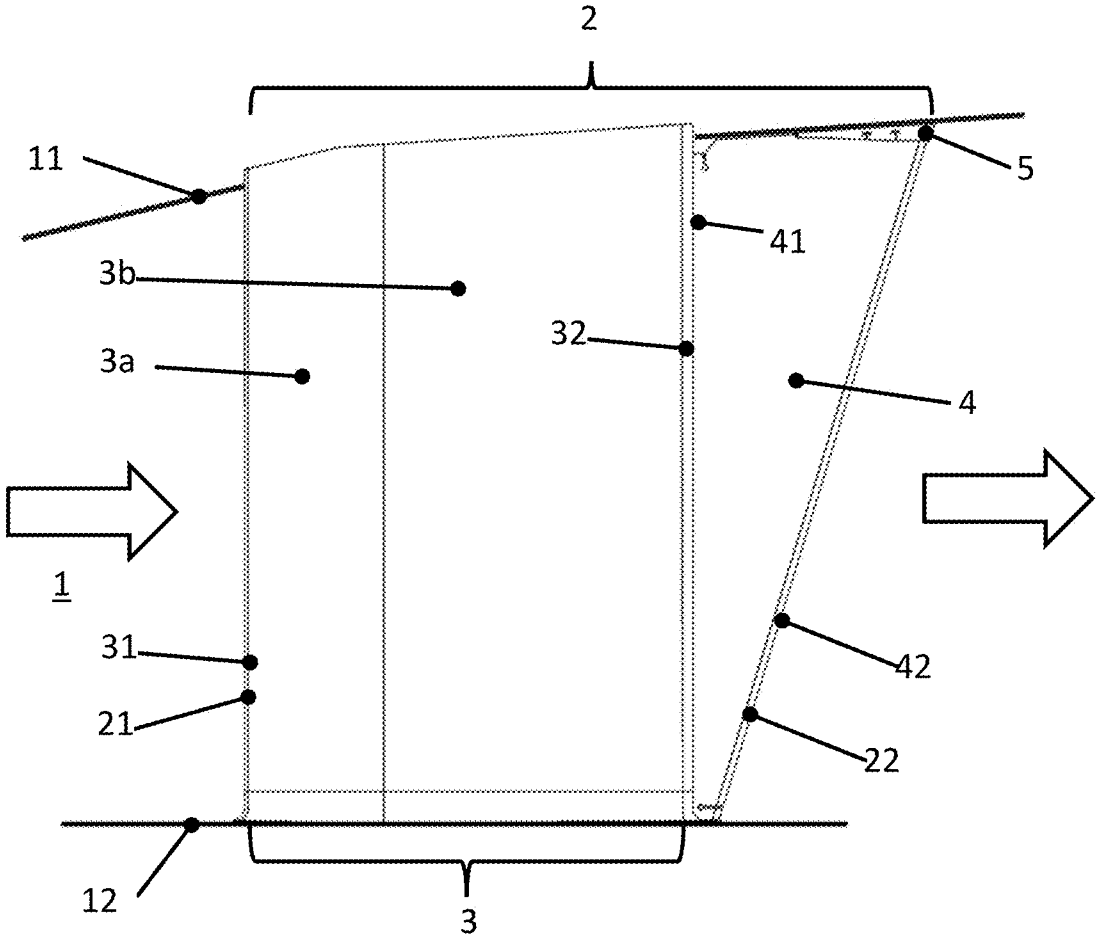
FIG. 1 is a side view of a strut assembly comprising a trailing member and installed inside a turbomachine exhaust diffuser, according to a first exemplary embodiment of the herein disclosed subject matter.

FIG. 1 shows a view of an exemplary strut assembly 2 in a diffuser of a turbo-engine, for instance in the diffuser 1 of an exhaust section of a gas turbine engine. Diffuser 1 is defined generally as an annulus between outer barrel 11 and inner barrel 12. Inner barrel 12 may house, for instance, an aft bearing of a gas turbine engine and other components. A multitude of circumferentially arranged and radially extending strut assemblies, such as shown strut assembly 2, provide structural support between outer barrel 11 and inner barrel 12. A flow of combustion gases flows through diffuser 1 as indicated by arrows in FIG. 1. The diffuser 1 serves to decelerate gases from the expansion turbine and thus to regain static pressure, which has a beneficial impact on efficiency. It is thus desired that strut assemblies, such as strut assembly 2, do not yield excessive resistance to a flow of gases through diffuser 1.

Strut assembly 2 comprises strut body 3 and trailing member 4. Strut body 3 may be cooled, for instance, in that a flow of cooling air is provided through strut body 3. The coolant flow may be directed longitudinally through strut body 3, which corresponds to a radial flow when relating it to the diffuser 1.

Strut body 3, in the presently shown exemplary embodiment, comprises two sections, namely upstream section 3*a* and downstream section 3*b*. This, however, is not relevant for the herein described subject matter. In the shown configuration, a first, radially outer, longitudinal end of strut body 3 is weld-connected to outer barrel 11, while a second, radially inner, longitudinal end of strut body 3 is weld-connected to inner barrel 12. Strut body 3 thus provides structural support between outer barrel 11 and inner barrel 12.

An upstream side 31 of strut body 3 is rounded in a cross-sectional view of strut body 3 to form an aerodynamically shaped leading edge 21 of strut assembly 2. An upstream side 41 of trailing member 4 is attached to a downstream side 32 of strut body 3 to jointly form strut assembly 2. A downstream end 42 of trailing member 4 provides a trailing edge 22 of strut assembly 2. A cross-sectional geometry of strut assembly 2 thus is generally droplet-shaped. Further, as shown in the side view of FIG. 1, trailing member 4 is generally wedge-shaped. An upstream-downstream extent of trailing member 4 thus increases in a radially outward direction.

A flow shield 5 is attached to radially outer barrel 11 and extends along a part of the circumference of the downstream portion of trailing member 4 adjacent the first, radially outer end of trailing member 4. The flow shield 5 is a skirt closely extending around the boundary of the downstream portion of the radially outer end of trailing member 4. As will become apparent below, one function of flow shield 5 may be to avoid excessive ingestion of combustion gases into a gap, which is present between outer barrel 11 and the downstream section of trailing member 4. In another aspect, a function of flow shield 5 may be to attenuate vibrations of the cantilevering downstream portion of the radially outer end of trailing member 4.

Figure 2:
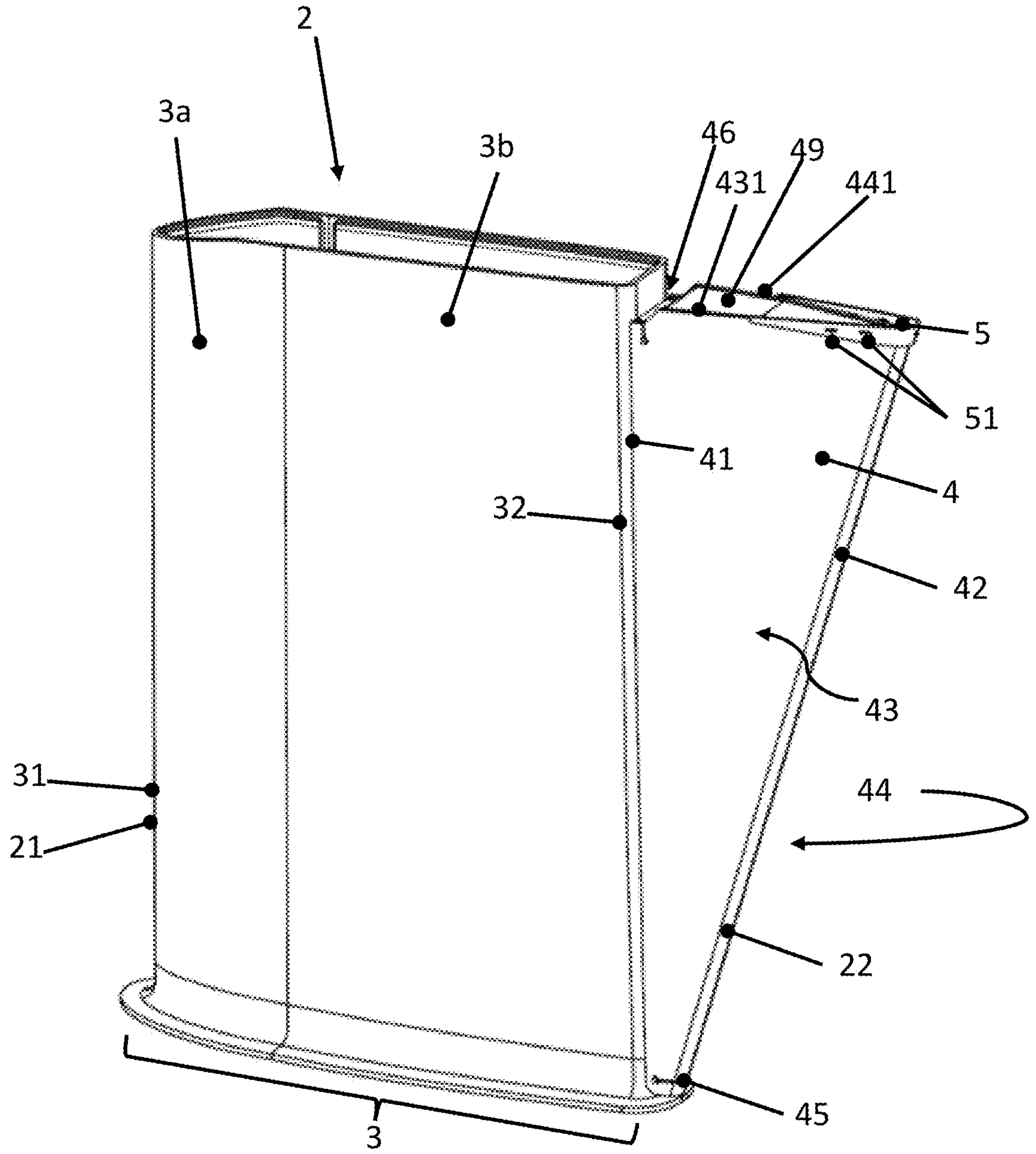
FIG. 2 is perspective side view of the strut assembly of FIG. 1.

FIG. 2 shows a more detailed view of strut assembly 2 separate from diffuser 1. Trailing member 4 comprises two side walls 43 and 44, wherein side walls 43 and 44 meet at the downstream end 42 of trailing member 4 to jointly form trailing edge 22. Side walls 43 and 44 may in certain embodiments be sections of one monolithic member of sheet metal, for instance, but may in other embodiments be separate members joined to each other, for instance along trailing edge 42. Only an edge 441 of side wall 44 is visible in the present depiction; however, the shape and location of side wall 44 will be readily apparent to a person having skill in the art. A first edge 431 of first side wall 43 and a first edge 441 of second side wall 44 are disposed proximate to or form a first longitudinal end of trailing member 4, which is intended to be provided as a radially outer longitudinal end of trailing member 4.

A cover plate 49 is provided between first side wall 43 and second side wall 44 adjacent to the first longitudinal end of trailing member 4 or to first edges 431 and 441 of side walls 43 and 44, respectively. Cover plate 49 closes trailing member 4, which may be a hollow member defined by first and second side walls 43 and 44 and an upstream end wall, at first longitudinal end 41 of trailing member 4. As can further be seen, the first longitudinal end 41 of trailing member 4 is recessed at recess 46 adjacent to the upstream side 41 of trailing member 4 and/or adjacent to the downstream side 32 of strut body 3, respectively. Stress relief slot 45 is provided proximate to an opposite second longitudinal end of trailing member 4 in order to account for potentially arising stress concentrations due to the intersection of the strut body 3, trailing member 4, and inner barrel 12.

Figure 3:
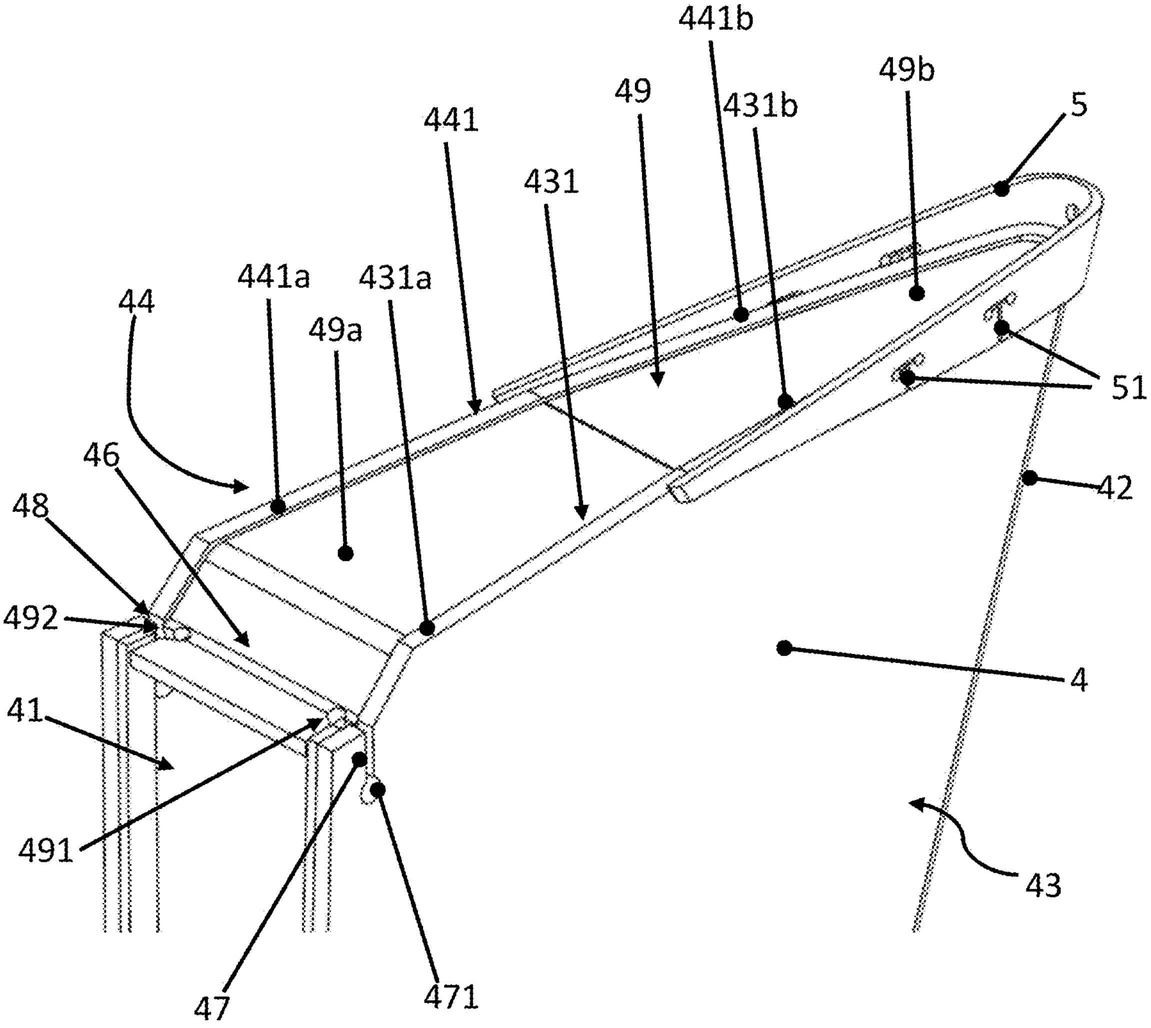
FIG. 3 is a more detailed perspective view of the first, or radially outer, end of the trailing member shown in FIGS. 1 and 2, together with a flow shield.

FIG. 3 shows a detailed view of the first longitudinal end of trailing member 4 together with flow shield 5. First edge 431 of first side wall 43 of trailing member 4 comprises upstream section 431*a* and downstream section 431*b*. When seen along an upstream-downstream direction, downstream section 431*b* of first edge 431 of first side wall 43 is angled radially inwardly, or towards the opposite, second longitudinal end of trailing member 4, relative to upstream section 431*a* of first edge 431 of side wall 43. Likewise, first edge 441 of second side wall 44 of trailing member 4 comprises upstream section 441*a* and downstream section 441*b*. When seen along an upstream-downstream direction, downstream section 441*b* of first edge 441 of second side wall 44 is angled radially inward, or towards an opposite, second longitudinal end of trailing member 4, relative to upstream section 441*a* of first edge 441 of second side wall 44. Hence, the first edge 431, 441 of each of first and second side walls 43, 44 are convexly shaped in a side view of the respective side wall. In another aspect, it may be said that the first longitudinal end of trailing member 4 is convexly shaped in a side view onto any of side walls 43, 44.

Cover plate 49 also comprises two sections 49*a* and 49*b*, wherein downstream section 49*b* is angled radially inward, or towards the second longitudinal end of trailing member 4 relative to upstream section 49*a* of cover plate 49, when seen along an upstream-downstream direction. This geometry enables that a gap between the first longitudinal end of trailing member 4 and outer barrel 11 may be configured smaller in an upstream section of the first longitudinal end of trailing member 4 than in a downstream section of the first longitudinal end of trailing member 4.

Flow shield 5 may be configured such that an upstream edge of flow shield 5 is spaced from the downstream side of strut body 3 in a downstream direction of exhaust diffuser 1, as can be seen in FIG. 1. Thus, a weld seam by which the flow shield 5 is attached to outer barrel 11 and a weld seam by which strut body 3 is attached to outer barrel 11 do not intersect.

The first longitudinal end of trailing member 4 is further provided with recess 46 adjacent upstream side 41 of trailing member 4. The recess is provided in that first edges 431, 441 of side walls 43, 44 are recessed at upstream side 41 of trailing member 4. The recessed section of each of first edges 431, 441, respectively, of side walls 43 and 44 comprises a concave corner. Stress relief slots 47, 48 on side walls 43, 44, respectively, open at the respective concave corner. Each stress relief slot 47, 48, when starting at an open end at the first edge 431, 441 of the respective side wall 43, 44 terminates at a rounded stress relief hole, of which only stress relief hole 471 of stress relief slot 47 is visible in the present depiction. The stress relief hole (e.g., 471) is sized and shaped to avoid notching effects at the end of a respective stress relief slot (e.g., 47).

Cover plate 49 extends across stress relief slots 47, 48 of side walls 43, 44. Cover plate 49 is provided with stress relief slots 491, 492 which open out at an edge of cover plate 49 adjacent each of stress relief slots 47, 48 of side walls 43, 44. As can be seen, stress relief slots 491, 492 of cover plate 49 also terminate at rounded stress relief holes (without reference numerals). As upstream end 41 of trailing member 4 is recessed from the downstream section of the first longitudinal end of trailing member 4, a weld seam by which the upstream edges of sidewalls 43, 44 are joined to the downstream side of strut body 3 (FIGS. 1 and 2) does not intersect with the weld seam by which strut body 3 is attached to outer barrel 11. Moreover, cover plate 49 is weld-connected to the inner side of side walls 43 and 44 in a section downstream of stress relief slots 47 and 48, or 491 and 492, respectively, while the weld seam is omitted and a gap between cover plate 49 and the inner surfaces of side walls 43 and 44 is left open at the upstream end of the trailing member 4, such that no stresses are induced between cover plate 49 and side walls 43 and 44 adjacent strut body 3, when trailing member 4 is installed as intended. The stress relief slots 47, 48, 491, 492 provided at the first longitudinal end of trailing member 4 together with the avoidance of intersecting weld seams reduce mechanical stresses and thus the risk of cracking. Further, recess 46 facilitates optical inspection of the interface between strut body 3, trailing member 4, and outer barrel 11.

As shown in FIG. 3, flow shield 5 is also provided with stress relief slots 51, which open out at a free edge of flow shield 5. Stress relief slots 51 are essentially anchor-shaped and terminate in rounded stress relief holes.

Figure 4:
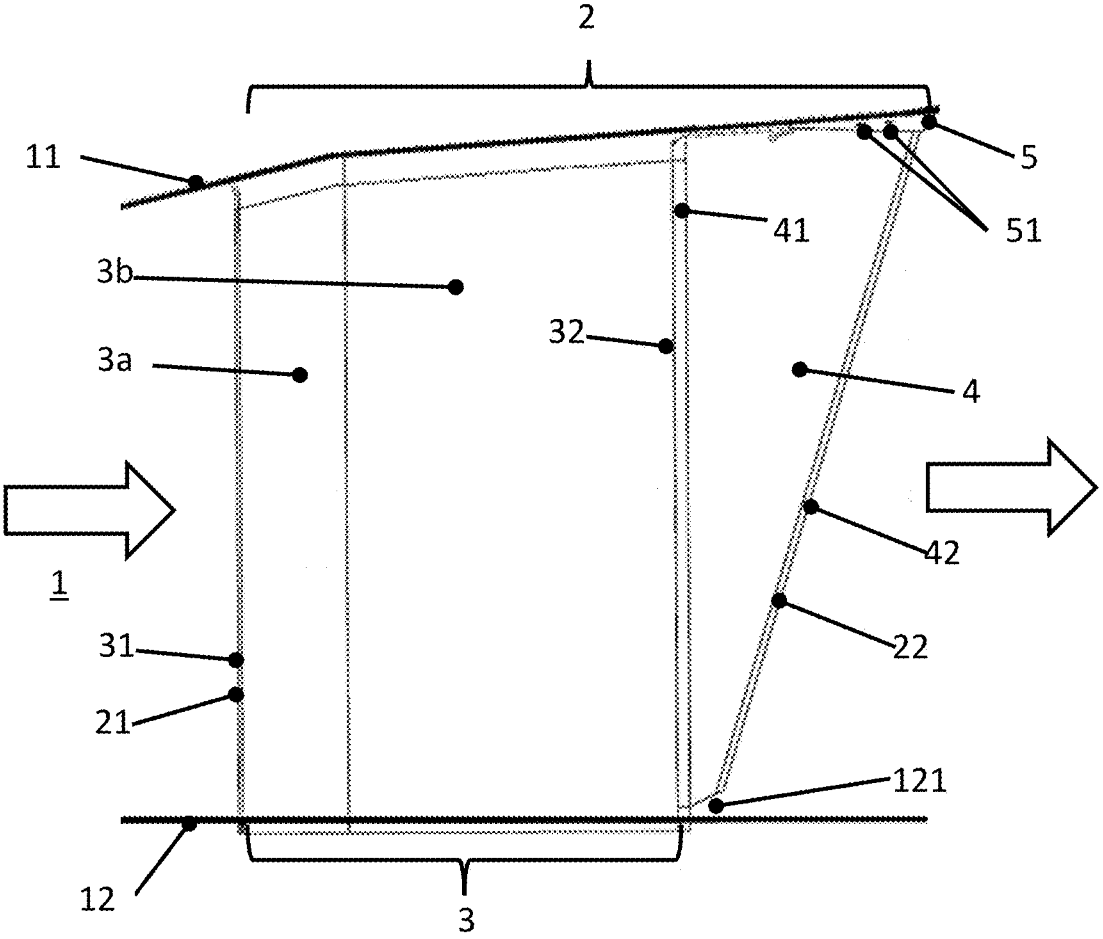
FIG. 4 is a side view of a strut assembly comprising a trailing member and installed inside a turbomachine exhaust diffuser, according to a second exemplary embodiment of the herein disclosed subject matter.

FIG. 4 illustrates a strut assembly 2 installed within a diffuser 1, which incorporates a different embodiment of trailing member 4. Essentially, analogous to the configuration shown in FIG. 1, an upstream side 41 of trailing member 4 is joined to a downstream side 32 of strut body 3. Consequently, trailing member 4 forms a trailing section of strut assembly 2. Just like in the embodiment outlined in connection with FIGS. 1 through 3, flow shield 5 is attached to outer barrel 11 and extends along a part of the circumference of the downstream portion of trailing member 4 adjacent the first, radially outward end of trailing member 4. Trailing member 4, in a direction from the first, radially outer longitudinal end of trailing member 4 to the second, radially inner longitudinal end of trailing member 4, ends before the second longitudinal end of strut body 3 such that a gap 121 is provided between the second longitudinal end of trailing member 4 and inner barrel 12.

Since the second longitudinal end of trailing member 4 in the present embodiment cantilevers freely from downstream side 32 of strut body 3, rather than being fixed to inner barrel 12 as well as to strut body 3, the second longitudinal end of trailing member 4 experiences lower stresses adjacent the second longitudinal end of trailing member 4 compared to the embodiment of FIGS. 1 through 3, and the stress relief slot 45 adjacent the second longitudinal end of trailing member 4 is thus omitted. On the downside, aerodynamics may be impaired adjacent inner barrel 12. However, dependent upon the ratio between the diameter of outer barrel 11 and the diameter of inner barrel 12, the affected share of the total mass flow is sufficiently small to disregard the aerodynamic disadvantage.

Figure 5:
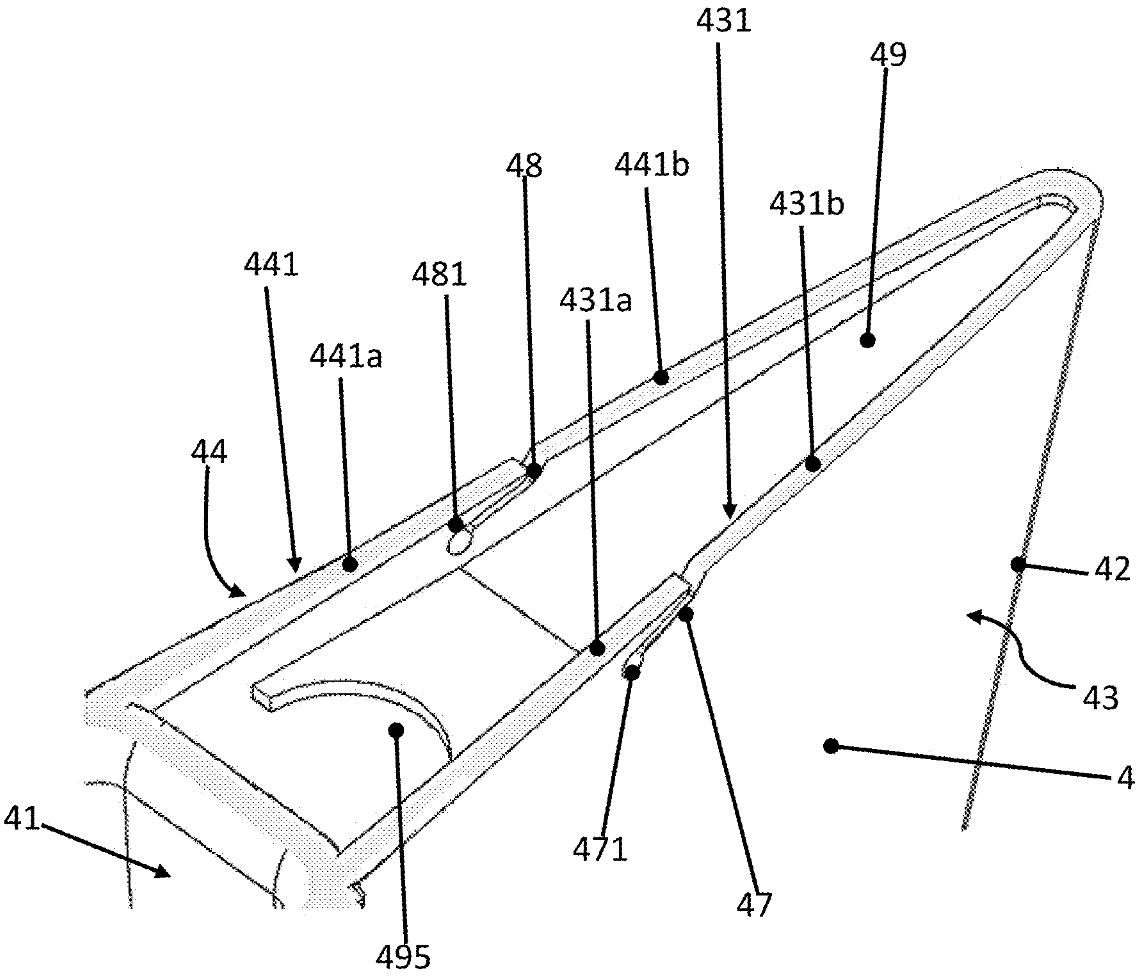
FIG. 5 is a more detailed perspective view of the first, or radially outer, end of the trailing member shown in FIG. 4; and, FIG. 6 is a side view of the strut assembly of FIG. 4 with the flow shield omitted.

FIG. 5 shows a detailed view of the first longitudinal end of trailing member 4 of FIG. 4, i.e., the longitudinal end which is adapted and configured, or destined, respectively, to be provided as the radially outer longitudinal end of trailing member 4. The flow shield 5 is not shown for better visibility. First edges 431 and 441 comprise upstream sections 431*a* and 441*a* and downstream sections 431*b* and 441*b*. When seen along an upstream-downstream direction, downstream sections 431*b* and 441*b* are angled towards the second longitudinal end of trailing member 4 relative to the respective upstream sections 431*a* and 441*a*. Hence, the first edge 431, 441 of each of first and second side walls 43, 44 is convexly shaped in a side view of the respective side wall. In another aspect, it may be said that the first longitudinal end of trailing member 4 is convexly shaped in a side view onto any of side walls 43, 44.

In the illustrated embodiment, stress relief slots 47 and 48 open at the corner points of first edges 431 and 441 of side walls 43, 44 where upstream sections 431*a* and 441*a* and respective downstream sections 431*b* and 441*b* meet. Stress relief slots 47 and 48 are tilted or angled relative to the longitudinal extent of trailing member 4, or a radial direction when trailing member 4 is installed as intended. Stress relief slots 47 and 48 extend, when starting form the openings at the respective edges, beneath upstream sections 431*a* and 441*a* of first edges 431 and 441 of side walls 43 and 44. The tilt provides a particularly efficient relief of stresses when trailing member 4 is installed inside a diffuser 1. Stress relief slots 47 and 48 terminate at rounded stress relief holes 471 and 481, respectively. An upstream edge of cover plate 49 is located a distance downstream from upstream end 41 of trailing member 4 such that the first longitudinal end of trailing member 4 is open adjacent upstream side 41. Further, U-shaped cutout 495 is provided at the upstream edge of cover plate 49. The cutout 495 may have a shape other than a U-shape, if desired.

Figure 6:
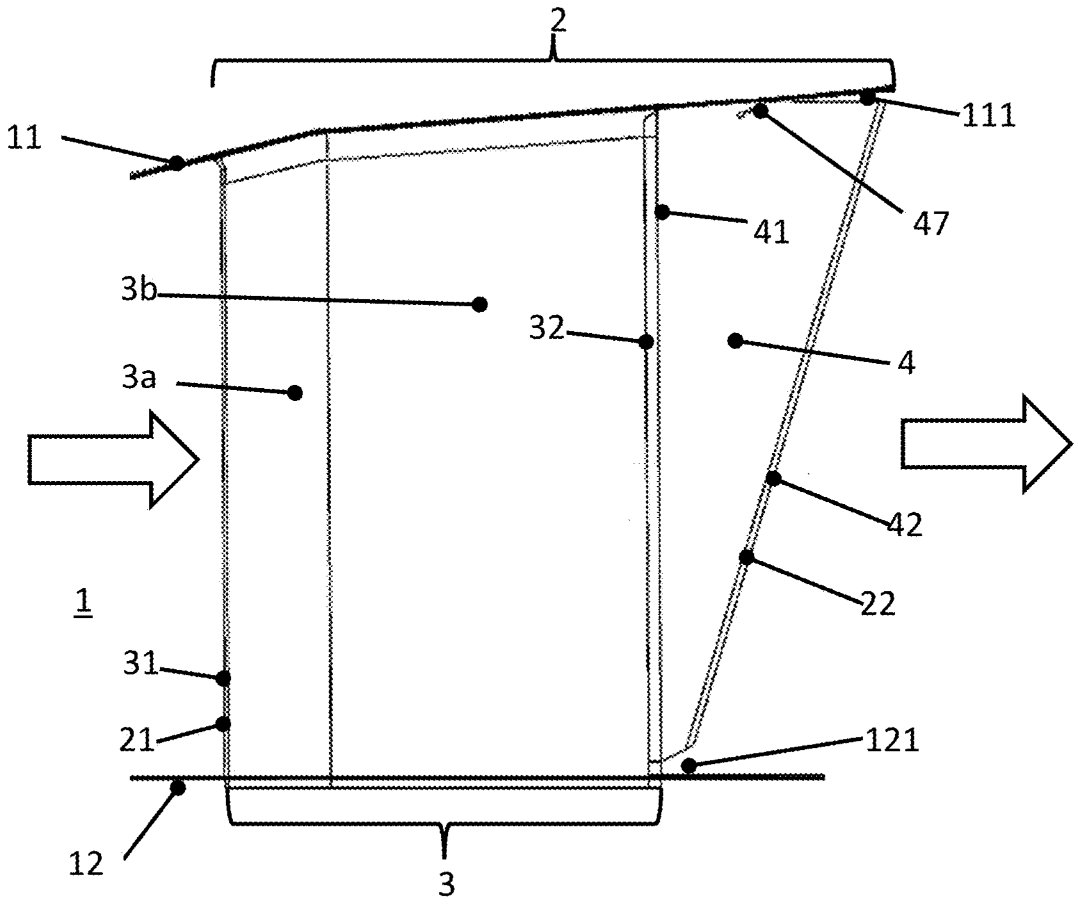

FIG. 6 shows the configuration of FIG. 4 without the flow shield 5. An upstream section of the first, radially outer end of trailing member 4 is weld-connected to outer barrel 11. With reference to FIG. 5, upstream sections 431*a* and 441*a* of first edges 431 and 441 of side walls 43 and 44 are weld-connected to outer barrel 11. On the other hand, a gap 111 is provided between outer barrel 11 and a downstream section of the first longitudinal end of trailing member 4. With reference to FIG. 5, gap 111 is provided between barrel 11 and downstream sections 431*b* and 441*b* of first edges 431 and 441 of side walls 43 and 44. With reference to FIG. 4, gap 111 is normally covered by flow shield 5. As can be readily concluded from a combined view of FIGS. 5 and 6, stress relief slots 47 and 48 extend beneath the welded sections of first edges 431 and 441 of side walls 43 and 44, and between the respective welded sections and non-welded sections of first edges 431 and 441. Stress relief slots 47 and 48 provide an amount of flexibility to side walls 43 and 44 adjacent to the respective first edges 431 and 441 to accommodate a certain degree of deformation without inducing excessive stresses.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

The invention claimed is:

1. A trailing member for a strut of a gas turbine exhaust diffuser, the trailing member comprising:

an upstream side;

a downstream end spaced along a downstream direction from the upstream side;

two side walls extending from the upstream side to the downstream end, wherein a distance between the two side walls decreases along a direction from the upstream side to the downstream end, whereby a cross-section of the trailing member tapers from the upstream side to the downstream end, wherein a longitudinal extent of the trailing member extends in a radial direction along the upstream side of the trailing member between a first longitudinal end of the trailing member and a second longitudinal end of the trailing member, wherein a first edge of each side wall is disposed proximate to the first longitudinal end of the trailing member, wherein the first edge of each side wall has a recessed edge extending from the upstream side only a partial distance in the direction from the upstream side toward the downstream end, wherein the recessed edge has a first angled edge portion extending from the upstream side, a second angled edge portion extending from the first angled edge portion, and an edge corner between the first and second angled edge portions; and a stress relief slot in the recessed edge of the first edge of at least one of the first or second side walls of the two side walls, wherein the stress relief slot opens directly at the first edge of the respective side wall and extends in the radial direction into the respective side wall.

2. The trailing member according to claim 1, wherein the stress relief slot provided in at least one of the first and second side walls and opening at the first edge of the respective side wall, when starting at an open end at the first edge of the respective side wall, terminates at a rounded stress relief hole.

3. The trailing member according to claim 1, wherein the first edge of each of the first and second side walls is convexly shaped in a side view onto the face of the respective side wall.

4. The trailing member according to claim 1, wherein the recessed edge of the first edge of each side wall has the second angled edge portion oriented at a first angle relative to the first angled edge portion and a second angle relative to a third angled edge portion of the first edge, wherein the first angled edge portion is radially offset from the third angled edge portion in the radial direction toward the second longitudinal end, wherein the first and third angled edge portions each extend in the direction from the upstream side toward the downstream end of the trailing member.

5. The trailing member according to claim 4, wherein the edge corner comprises a concave corner and wherein the stress relief slot opens directly at the concave corner and extends in the radial direction into the respective side wall.

6. The trailing member according to claim 5, wherein a distance between the upstream side of the trailing member and the downstream end of the trailing member decreases from the first longitudinal end of the trailing member to the second longitudinal end of the trailing member.

7. A system, comprising:

a trailing member of a strut of a gas turbine exhaust diffuser, wherein the trailing member comprises:

first and second side walls extending in a downstream direction from an upstream side to a downstream end, wherein the first and second side walls converge toward one another in the downstream direction, wherein the first and second side walls extend in a longitudinal direction from a first longitudinal end to an opposite second longitudinal end of the trailing member, wherein each of the first and second sides walls terminates at a first edge at the first longitudinal end; and at least one stress relief slot disposed in the first side wall, the second side wall, or a combination thereof, at the first longitudinal end, wherein the at least one stress relief slot extends directly from the first edge of a respective side wall of the first or second side walls in the longitudinal direction into the respective side wall.

8. The system of claim 7, wherein the at least one stress relief slot comprises a first stress relief slot disposed at the first edge in the first side wall and a second stress relief slot disposed at the first edge in the second side wall.

9. The system of claim 7, wherein the at least one stress relief slot extends from the first edge of the first or second side wall in the longitudinal direction inwardly to a rounded stress relief hole.

10. The system of claim 7, wherein the first edge of the first and second side walls is recessed to define a recessed edge adjacent to the upstream side of the trailing member, wherein the recessed edge has a first angled edge portion extending from the upstream side, a second angled edge portion extending from the first angled edge portion, and an edge corner between the first and second angled edge portions, and wherein the at least one stress relief slot is disposed in the recessed edge.

11. The system of claim 10, wherein the recessed edge of the first edge of each respective side wall of the first and second side walls has the second angled edge portion oriented at a first angle relative to the first angled edge portion and a second angle relative to a third angled edge portion of the first edge, wherein the first angled edge portion is radially offset from the third angled edge portion in the longitudinal direction toward the second longitudinal end, wherein the first and third angled edge portions each extend in the downstream direction from the upstream side toward the downstream end of the trailing member.

12. The system of claim 11, wherein the first edge of each respective side wall of the first and second side walls comprises a fourth angled edge portion extending between the third angled edge portion and the downstream end, wherein the fourth angled edge portion is angled inwardly toward the second longitudinal end in the downstream direction.

13. The system of claim 12, comprising a flow guide having a side wall extending along the first edge of the first and second side walls to the downstream end, wherein the flow guide extends only a portion of a distance from the upstream side to the downstream end at least partially along the fourth angled edge portion in the first and second side walls, wherein the side wall of the flow guide has a variable height that increases to define a tapered side wall in the downstream direction toward the downstream end.

14. The system of claim 13, wherein the flow guide comprises one or more stress relief slots disposed in the taped side wall along each of the first and second wide walls.

15. The system of claim 13, comprising a cover plate extending between the first and second side walls adjacent the first longitudinal end, wherein the cover plate comprises a first angled plate portion aligned with and extending in the downstream direction along the first angled edge portion, a second angled plate portion aligned with and extending in the downstream direction along the second angled edge portion, a third angled plate portion aligned with and extending in the downstream direction along the third angled edge portion, and a fourth angled plate portion aligned with and extending in the downstream direction along the fourth angled edge portion.

16. The system of claim 15, wherein the at least one stress relief slot comprises a first stress relief slot disposed in the edge corner at the first edge in the first side wall and a second stress relief slot disposed in the edge corner at the first edge in the second side wall, wherein the cover plate comprises third and fourth stress relief slots aligned with the respective first and second stress relief slots, wherein the third and fourth stress relief slots are disposed at a plate corner between the first and second angled plate portions of the cover plate.

17. The system of claim 7, comprising the strut, the gas turbine exhaust diffuser, a gas turbine engine, or a combination thereof, having the trailing member.

18. A system, comprising:

a trailing member of a strut of a gas turbine exhaust diffuser, wherein the trailing member comprises:

first and second side walls extending in a downstream direction from an upstream side to a downstream end, wherein the first and second side walls extend in a longitudinal direction from a first longitudinal end to an opposite second longitudinal end of the trailing member, wherein each of the first and second sides walls terminates at a first edge at the first longitudinal end; and a first stress relief slot disposed in the first edge in the first side wall;

a second stress relief slot disposed in the second edge in the second side wall;

a cover plate extending between the first and second side walls adjacent the first longitudinal end, wherein the cover plate comprises a plurality of angled plate portions that change in angle from the upstream side to the downstream end; and a flow guide extending along the first and second side walls adjacent the first longitudinal end to the downstream end, wherein the flow guide extends only a portion of a distance from the upstream side to the downstream end along at least one of the plurality of angled plate portions, wherein the side wall of the flow guide has a variable height that increases to define a tapered side wall in the downstream direction toward the downstream end.

19. The system of claim 18, wherein the first edge of the first and second side walls is angled inwardly toward the second longitudinal end in the downstream direction to define a variable gap that increases in the downstream direction toward the downstream end, wherein one of the plurality of angled plate portions is angled inwardly toward the second longitudinal end in the downstream direction along the first edge and the variable gap, wherein the side wall of the flow guide has the variable height that increases to define the tapered side wall to cover the variable gap in the downstream direction toward the downstream end.

* * * * *